July 3, 1923.

J. E. McGEE 1,460,760

BASKET SUPPORTING MEANS

Filed Aug. 29, 1922    2 Sheets-Sheet 1

Inventor
Jesse E. McGee.

By Beall & Fenwick,
Attorneys

July 3, 1923.
J. E. McGEE
BASKET SUPPORTING MEANS
Filed Aug. 29, 1922   2 Sheets-Sheet 2
1,460,760
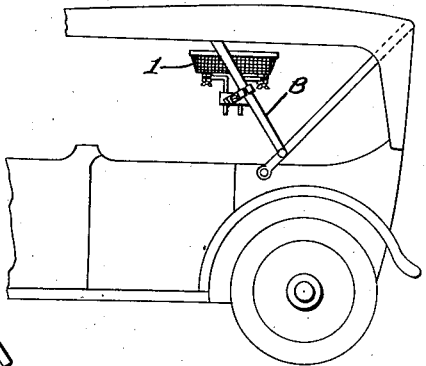
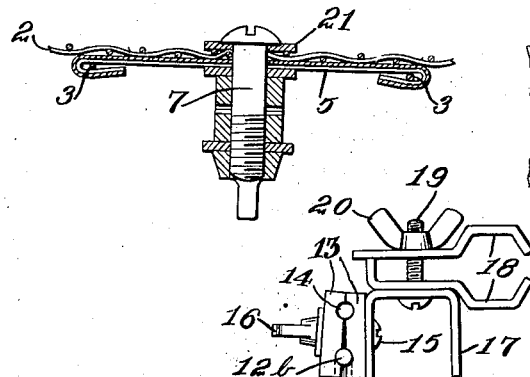
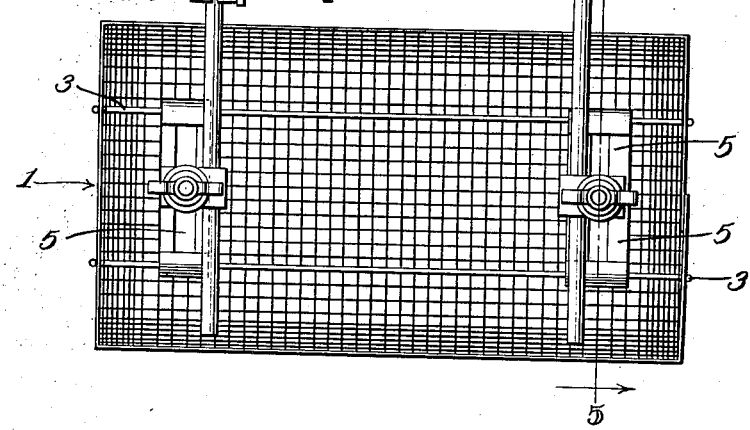
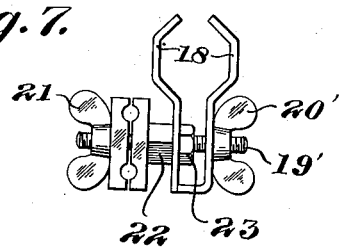
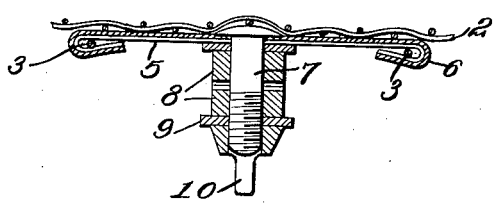
Inventor
Jesse E. McGee.
By   Beall & Fenwick,
Attorneys Patented July 3, 1923.

1,460,760

UNITED STATES PATENT OFFICE.

JESSE E. McGEE, OF GUNTOWN, MISSISSIPPI.

BASKET-SUPPORTING MEANS.

Application filed August 29, 1922. Serial No. 585,008.

*To all whom it may concern:*

Be it known that I, JESSE E. McGEE, a citizen of the United States, residing at Guntown, in the county of Lee and State of Mississippi, have invented certain new and useful Improvements in Basket-Supporting Means; and I do hereby declare the following to be a full, clear, and exact description of the invention, such as will enable others skilled in the art to which it appertains to make and use the same.

This invention relates to improvements in basket supporting means and has for its object to provide supporting means of such character that the basket can be supported from various parts of an automobile or other places where a basket may have utility.

The various features of novelty and invention will appear from the detailed description taken in connection with the accompanying drawings forming a part of the specification, the combinative association of parts being set forth in the appended claims.

In the drawings Fig. 1 is an end elevation of the improved basket supporting means showing the same as attached to the robe rail at the back of an automobile seat;

Fig. 2 is a side elevation of the invention showing the basket attached to a bow member of an automobile;

Fig. 4 is a bottom plan view of the basket showing a clamp member on one of the supporting rods;

Fig. 5 is the section on line 5—5 of Fig. 4, and

Fig. 6 is a view corresponding to Fig. 5 but showing a slight modification of the invention.

Fig. 7 shows a modified form of clamp.

Figure 1:
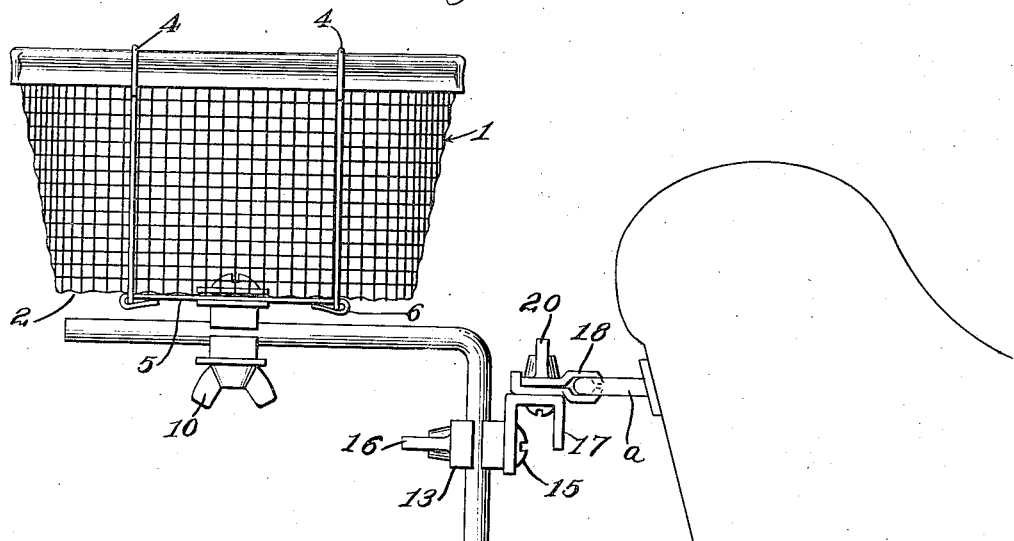

In the drawings the basket is generally indicated by 1, and 2 indicates the bottom thereof. Extending lengthwise of the bottom of the basket is a pair of spaced rods 3, these rods extending up along the ends of the basket and secured to the rim thereof preferably by having the terminals of the rods hooked or looped thereover as at 4.

Bridging these rods at the bottom of the basket is a pair of brackets 5, and these brackets are preferably secured to the rods by having their ends looped over the same as shown at 6, this arrangement allowing the brackets to be shiftably supported by said rods. Extending through each bracket 5 is a bolt 7 and mounted on the bolt is a clamp member 8, which preferably comprises two similar pieces. 9 indicates a washer and 10 a butterfly nut on the bolt for effecting a gripping action by said clamps.

The bolt 7 preferably passes through the middle of the clamp members to permit the formation of a pair of clamping sockets 11, one socket on either end of the bolt. Associated with each of the clamps is one or more supporting rods preferably angular or L-shaped rods 12, 12$^a$ indicating that part of the rod which is gripped by the clamp 8 and 12$^b$ the other part of the rod which is adapted to be gripped by other clamping means.

Figure 3:
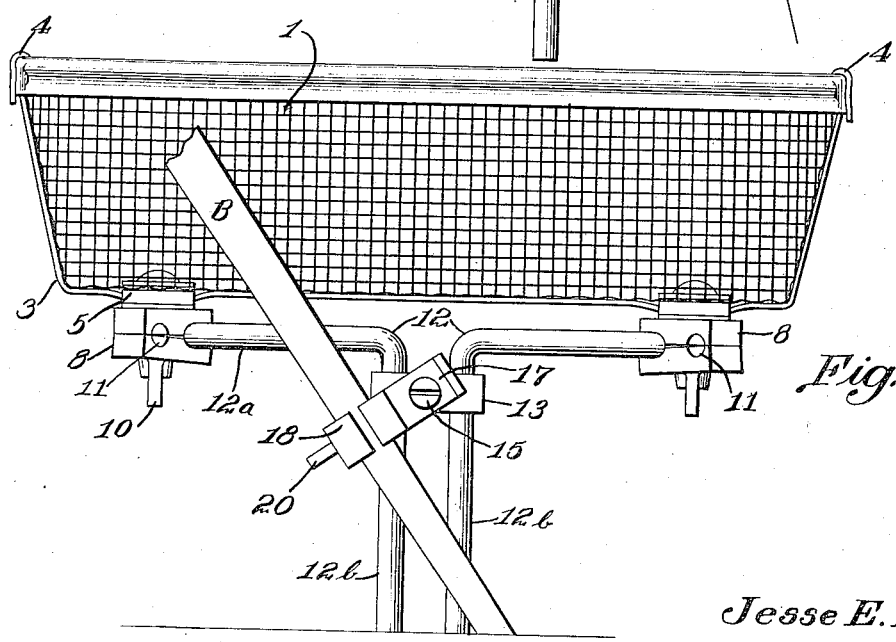
Fig. 3 is a similar view on an enlarged scale.

The clamping means adapted to grip the parts 12$^b$ of the rods 12, comprises clamps 13 consisting of two separate blocks, these blocks being preferably provided with a plurality of sockets 14, whereby the clamps may be employed to grip only one of the section 12$^b$ as shown in Fig. 4 or both as shown in Figs. 1, 2 and 3. 15 indicates the bolt which passes through the blocks comprising the clamp 13, and 16 the butterfly nut on one end of the bolt 15 for applying gripping or clamping action to the clamp. The bolt 15 also passes through one leg of a U-member 17, the bottom or transverse part of the U-member mounting a clamping member 18, there being a bolt 19 which passes through the transverse part of the U and through the elements of the clamping member 18, 20 indicating the butterfly nut on said bolt. The axes of the bolts 15 and 19 and the arms 12$^b$ of the angular rods 12 extend transversely with respect to each other and, consequently, the clamp 18 can be arranged in a great variety of positions with respect to the support on which the basket is to be supported. In Fig. 1 the clamping mechanism on the arms 12$^b$ is shown as adjusted for attachment to a horizontally extending robe rail A, while in Figs. 2 and 3 it is shown attached to one of the inclined braces or support B of an automobile top or canopy.

As shown in detail in Fig. 5, the bolt 7 may pass through the bottom of the basket as well as the bracket 5, 21 indicating a washer between the head of the bolt and the bottom of the basket. This arrangement may be employed when the distance between the clamps 8 has once been fixed and there is no further need of adjustment of the brackets 5 on the rods 3. It is within the scope of the invention, however, to dispose the head of the bolt 7 below the basket as shown in Fig. 6, this arrangement permitting ready adjustment of the brackets 5 on the rods 3.

It will now be seen that I have provided an assembly which can be readily attached to a basket such as a wire basket with a minimum amount of labor. To attach the assembly to the basket it is merely necessary to pass the ends of the rods 3 under the rim of the basket and bend the same over as at 4 to prevent separation of the rods and basket. The bracket members 5 serve to maintain the rods 3 in spaced relation and, by reason of the fact that they are movably mounted on said rods, the distance between the clamps can be adjusted to suit the particular type of basket employed. Furthermore, by arranging the rods 3 longitudinally of the bottom of the basket, the rods serve to reinforce the bottom of the basket, as will be readily appreciated. The rods 12 have their arms $12^a$ and $12^b$ of sufficient length to allow a wide range of adjustment. By reference to Fig. 1, it will be seen that the basket can be moved toward or from the bend of the rods 12 and the height of the basket with respect to the support A or B can be readily varied by sliding the arms $12^b$ up or down with respect to the clamp 13. In Fig. 3 I have shown the arms $12^b$ as gripped by the same clamping member 13. At times, however, it may not be expedient to grip both members $12^b$ by the same clamp. In such event the arms $12^b$ can be gripped by individual clamps as shown in Fig. 4, it merely being necessary in such cases to use duplicate clamping members.

It may be pointed out that the rods 3 can be made of a standard length which will be long enough to take the longest basket that may be used, it being merely necessary to cut off or shorten the rods for baskets of shorter length. This permits economy of manufacture since the assembly can be made in a standard size and be attached to baskets of different lengths in a very simple manner.

In Fig. 7 I have illustrated a modified form of clamping device by means of which the elements 13 are secured with an equally wide field of adjustment but eliminating the U-shaped element 17. In this structure a threaded rod 19' is secured to one of the clamping elements 18 as by nuts 22 and 23 and the other clamping element 18 adjustably secured thereon as by wing nut 20'. The clamping elements 13 are also secured on rod 19' between nut 22 and a wing nut 21. Other modifications will readily suggest themselves to those skilled in the art, but within the scope of the present invention.

What I claim is:

1. A basket supporting means comprising a pair of spaced basket engaging rods, a pair of basket engaging clamps connected with said rods, a pair of substantially L-shaped rods slidably adjustable in said clamps, and means associated therewith for securement to a support.

2. A basket supporting means comprising a pair of basket engaging rods, a pair of basket engaging clamps also engaging said rods, a pair of L-shaped rods slidably adjustable in said clamps, a clamp for connecting said rods together, and means associated therewith for securement to a support.

3. A basket supporting means comprising a pair of basket engaging rods, a pair of basket engaging clamps, said clamps connecting said rods, a pair of substantially L-shaped rods slidably adjustable in said clamps, a clamp for connecting said rods together and means swively connected thereto for securement to support.

In testimony whereof I affix my signature in presence of two witnesses.

JESSE E. McGEE.

Witnesses:
 ICA WATSON,
 LUTHER BRYAN.